United States Patent
Worfolk et al.

(10) Patent No.: US 10,168,843 B2
(45) Date of Patent: Jan. 1, 2019

(54) SYSTEM AND METHOD FOR DETERMINING USER INPUT FROM OCCLUDED OBJECTS

(71) Applicant: Synaptics Incorporated, San Jose, CA (US)

(72) Inventors: Patrick Worfolk, San Jose, CA (US); Joel Jordan, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 98 days.

(21) Appl. No.: 15/152,814

(22) Filed: May 12, 2016

(65) Prior Publication Data
US 2016/0253008 A1 Sep. 1, 2016

Related U.S. Application Data

(63) Continuation of application No. 14/503,682, filed on Oct. 1, 2014, now Pat. No. 9,367,191, which is a (Continued)

(51) Int. Cl.
*G06F 3/044* (2006.01)
*G06F 3/041* (2006.01)

(52) U.S. Cl.
CPC .......... *G06F 3/044* (2013.01); *G06F 3/0412* (2013.01); *G06F 3/0416* (2013.01); *G06F 2203/04104* (2013.01)

(58) Field of Classification Search
CPC .......... G06F 2203/04104; G06F 3/044; G03F 3/0416
See application file for complete search history.

(56) References Cited

U.S. PATENT DOCUMENTS

| 3,846,755 A | 11/1974 | Hart |
| 4,782,328 A | 11/1988 | Denlinger |
| (Continued) | | |

OTHER PUBLICATIONS

Westerman Wayne: "Hand Tracking Finger Identification and Chordic Manipulation on a Multi-touch Surface", Ph.D Dissertation, Spring 1999, University of Delaware (333 pages).

(Continued)

*Primary Examiner* — Chun-Nan Lin
(74) *Attorney, Agent, or Firm* — Ferguson Braswell Fraser Kubasta PC

(57) ABSTRACT

Devices and method are provided that facilitate improved input device performance. Specifically, the systems and methods are configured to identify a portion of an image of sensor values as corresponding to at least one sensed object in the sensing region, determine a polygon corresponding to the identified portion of the image, and determine a contact characterization of the at least one sensed object based on the polygon. The determination of a polygon corresponding to a sensed object facilitates improved contact characterization of the sensed object. For example, the determined polygon may be used to determine if the sensed object is actually more than one object. As a second example, the determined polygon may be used to determine the orientation of the sensed object. In addition, determined polygons may be used to more accurately track changes in the position of the sensed object.

20 Claims, 8 Drawing Sheets

Related U.S. Application Data continuation of application No. 13/243,803, filed on Sep. 23, 2011, now Pat. No. 8,884,916.

(60) Provisional application No. 61/421,311, filed on Dec. 9, 2010.

(56) References Cited

U.S. PATENT DOCUMENTS

| | | | |
|---|---|---|---|
| 4,783,829 | A | 11/1988 | Miyakawa et al. |
| 5,335,298 | A | 8/1994 | Hevenor et al. |
| 5,485,568 | A | 1/1996 | Venable et al. |
| 5,510,813 | A | 4/1996 | Makinwa et al. |
| 5,892,854 | A | 4/1999 | de Queiroz et al. |
| 5,969,339 | A | 10/1999 | McMurray et al. |
| 6,201,888 | B1 | 3/2001 | Kalvin |
| 6,392,686 | B1 | 5/2002 | Kao et al. |
| 7,440,588 | B2 | 10/2008 | Kaneko et al. |
| 7,526,140 | B2 | 4/2009 | Fang et al. |
| 7,593,000 | B1 | 9/2009 | Chin |
| 7,619,618 | B2 | 11/2009 | Westerman et al. |
| 7,764,274 | B2 | 7/2010 | Westerman et al. |
| 7,812,828 | B2 | 10/2010 | Westerman et al. |
| 7,835,568 | B2 | 11/2010 | Park et al. |
| 7,962,311 | B2 | 6/2011 | Launay et al. |
| 8,284,166 | B2 | 10/2012 | Taylor et al. |
| 8,335,996 | B2 | 12/2012 | Davidson et al. |
| 2004/0246250 | A1 | 12/2004 | Kaku et al. |
| 2005/0021582 | A1 | 1/2005 | Kallay |
| 2005/0159223 | A1 | 7/2005 | Tahara et al. |
| 2005/0164794 | A1 | 7/2005 | Tahara |
| 2006/0026521 | A1 | 2/2006 | Hotelling et al. |
| 2007/0139395 | A1 | 6/2007 | Westerman et al. |
| 2007/0248268 | A1 | 10/2007 | Wood |
| 2007/0252821 | A1 | 11/2007 | Hollemans et al. |
| 2008/0153601 | A1 | 6/2008 | Tahara et al. |
| 2008/0158193 | A1 | 7/2008 | Lapstun et al. |
| 2008/0168403 | A1* | 7/2008 | Westerman ......... G06F 3/04883 715/863 |
| 2008/0180406 | A1 | 7/2008 | Han et al. |
| 2008/0199077 | A1 | 8/2008 | Fowell |
| 2008/0240494 | A1 | 10/2008 | Oosawa et al. |
| 2008/0252615 | A1 | 10/2008 | Shipton |
| 2008/0309629 | A1 | 12/2008 | Westerman et al. |
| 2009/0095540 | A1 | 4/2009 | Zachut et al. |
| 2009/0284495 | A1* | 11/2009 | Geaghan ............... G06F 3/0416 345/174 |
| 2009/0300531 | A1 | 12/2009 | Pryor |
| 2010/0079405 | A1* | 4/2010 | Bernstein ............ G06F 3/04883 345/174 |
| 2010/0103133 | A1 | 4/2010 | Park et al. |
| 2010/0189320 | A1 | 7/2010 | Dewaele |
| 2010/0201631 | A1 | 8/2010 | Taylor et al. |
| 2010/0251188 | A1* | 9/2010 | Fu ....................... G06F 3/04883 715/863 |
| 2010/0259504 | A1 | 10/2010 | Doi et al. |
| 2011/0260994 | A1 | 10/2011 | Saynac et al. |
| 2011/0310040 | A1 | 12/2011 | Ben-Shalom et al. |

OTHER PUBLICATIONS

USPTO, Office Action for U.S. Appl. No. 13/273,051, dated Sep. 18, 2014 (13 pages).

USPTO, Office Action for U.S. Appl. No. 13/273,051, dated Oct. 8, 2013 (14 pages).

* cited by examiner

US 10,168,843 B2

SYSTEM AND METHOD FOR DETERMINING USER INPUT FROM OCCLUDED OBJECTS

PRIORITY DATA

This application is a continuation application of U.S. patent application Ser. No. 14/503,682, which filed on Oct. 1, 2014. U.S. patent application Ser. No. 14/503,682 is a continuation of U.S. patent application Ser. No. 13/243,803, which filed on Sep. 23, 2011, U.S. patent application Ser. No. 13/243,803 is a non-provisional application of U.S. Provisional Patent Application Ser. No. 61/421,311, which filed on Dec. 9, 2010. This application claims benefit of U.S. patent application Ser. Nos. 14/503,682 and 13/243,803 under 35 U.S.C. § 120. This application also claims priority to U.S. Provisional Patent Application Ser. No. 61/421,311, under 35 U.S.C. § 119(e). All mentioned U.S. non-provisional patent applications and the provisional patent application are incorporated herein by reference in their entirety.

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

While input devices have found many applications, engineers continue to seek design alternatives that reduce costs and/or improve sensor performance. For example, improvements in efficiently and reliably detecting and locating the presence of input objects in the sensing region.

One continuing issue is the ability to accurately track the position of input objects in the sensing region. In general, the greater the ability to accurately track object position the greater the usability of the device. This is particularly true for input devices that can sense and track multiple input objects simultaneously.

Thus, there remains a continuing need for improvements in the techniques used to detect and identify objects in proximity sensor devices. Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved input devices. Specifically, the devices and methods provide the ability to reliably determine information about input in a sensing region, and thus facilitate improved input device performance.

In one embodiment, an input device comprises a plurality of capacitive sensor electrodes and a processing system coupled to the electrodes and configured to operate the electrodes to sense in a sensing region. Specifically, the processing system is configured to identify a portion of an image of sensor values as corresponding to at least one sensed object in the sensing region, determine a polygon corresponding to the identified portion of the image, and determine a contact characterization of the at least one sensed object based on the polygon. The determination of a polygon corresponding to a sensed object facilitates improved contact characterization of the sensed object. For example, the determined polygon may be used to determine if the sensed object is actually more than one object. As a second example, the determined polygon may be used to determine the orientation of the sensed object.

In addition, the determination of the polygon may facilitate improved device usability. For example, determined polygons may be used to more accurately track changes in the position of the sensed object. As such, determined polygons may be used to provide consistent user interface actions in response to detected object motion.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved noise determination.

Figure 1:
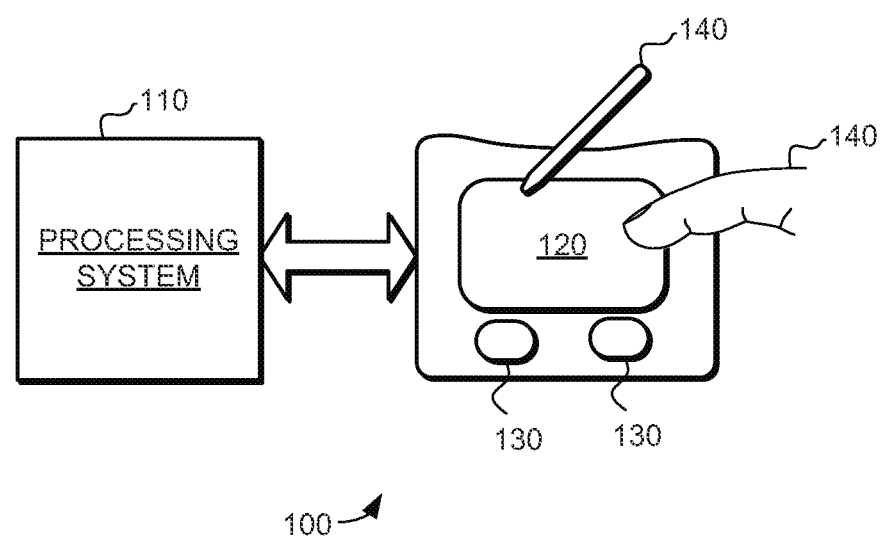
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to capacitively sense input provided by one or more input objects 140 in a sensing region 120. Example input objects include fingers and styli, as shown in FIG. 1.

Sensing region 120 encompasses any space above, around, in and/or near the input device 100 in which the input device 100 is able to capacitively detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

Some implementations are configured to provide images that span one, two, three, or higher dimensional spaces. Some implementations are configured to provide projections of input along particular axes or planes.

In suitable capacitive implementations of the input device 100, voltage or current is applied to create an electric field. Nearby input objects cause changes in the electric field, and produce detectable changes in capacitive coupling that may be detected as changes in voltage, current, or the like.

Some such capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

As specific examples, the processing system 110 may comprise sensor electrode circuitry configured to operate a plurality of capacitive sensor electrodes to produce pluralities of preliminary values. The processing system 110 may also comprise a determination module configured to identify a portion of an image of sensor values as corresponding to at least one sensed object in the sensing region 120, determine a polygon corresponding to the identified portion of the image, and determine a contact characterization of the at least one sensed object based on the polygon. The determination of a polygon corresponding to a sensed object facilitates improved contact characterization of the sensed object. For example, the determined polygon may be used to determine if the sensed object is actually more than one object. As a second example, the determined polygon may be used to determine the orientation of the sensed object. These and other operations are described in detail below with reference to the operation of the processing system 110. Thus, while the details of these and other operations are described with reference to the processing system 110 in general, the entirety of or a portion of such operations may be performed by the determination module or any other suitable module and/or circuitry that is part of the processing system 110.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

In general, the various embodiments provide devices and methods that facilitate improved input devices. Specifically, the devices and methods provide the ability to reliably determine information about input in a sensing region, and thus facilitate improved input device performance.

In one embodiment, an input device 100 comprises a processing system 110 and plurality of capacitive sensor electrodes. The processing system 110 is coupled to the capacitive sensor electrodes and configured to operate the electrodes to sense in the sensing region 120. In general the processing system 110 is configured to determine information about input objects in the sensing region 120 based on measured values. As described above, this information about input objects in the sensing region 120 may be used to provide a variety of user interface actions.

During operation of the input device 100, the processing system 110 is configured to identify a portion of an image of sensor values as corresponding to at least one sensed object in the sensing region, determine a polygon corresponding to the identified portion of the image, and determine a contact characterization of the at least one sensed object based on the polygon. The determination of a polygon corresponding to a sensed object facilitates improved contact characterization of the sensed object. For example, the determined polygon may be used to determine if the sensed object is actually more than one object. As a second example, the determined polygon may be used to determine the orientation of the sensed object. These and other operations are described in detail below with reference to the operation of the processing system 110. Thus, while the details of these and other operations are described with reference to the processing system 110 in general, the entirety of or a portion of such operations may be performed by the determination module or any other suitable module and/or circuitry that is part of the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
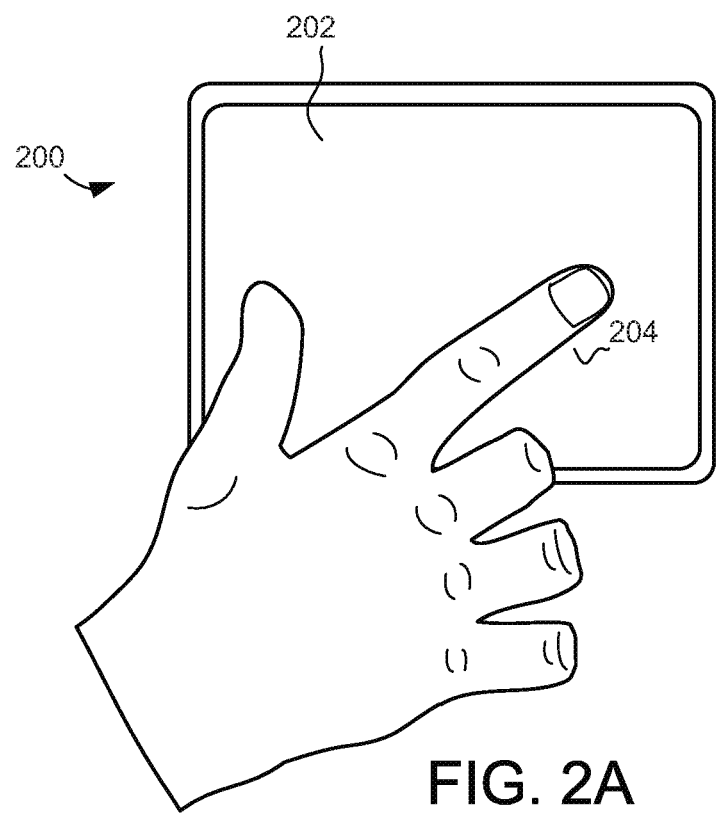
FIGS. 2A, 2B and 2C are a top view of an input device, cross-sectional side view of the input device, and a top view of the sensor electrodes in accordance with an embodiment of the invention.
Figure 2B:
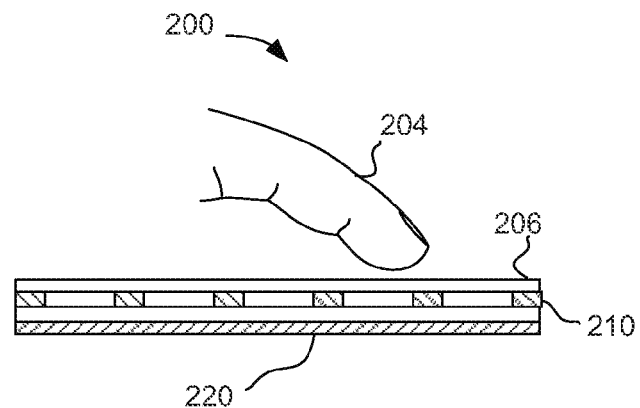
Figure 2C:
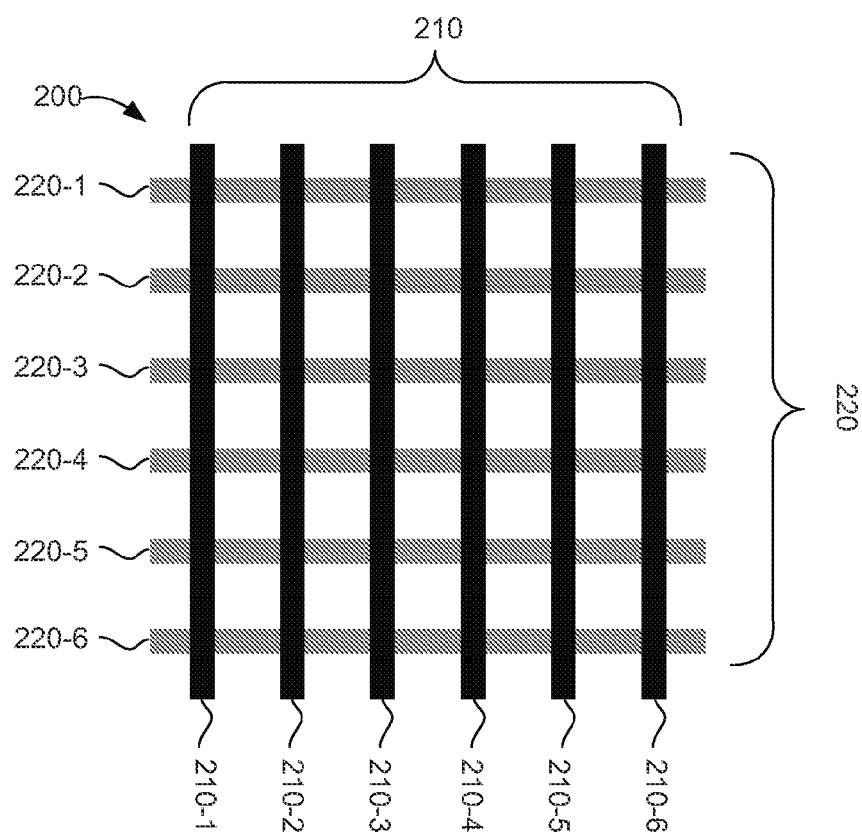

Turning now to FIG. 2, one embodiment of an exemplary input device 200 is illustrated. Specifically, FIG. 2A shows a top view of an input device 200 with a sensing region 202 and an input object (i.e., finger 204) in the sensing region 202. FIG. 2B shows a cross-sectional side view of the input device 200, including a sensor electrodes 210 and 220 and an overlying touch layer 206. FIG. 2C shows a top view of the sensor electrodes 210 and 220. For clarity of illustration and description, FIG. 2C shows the sensor electrodes 210 and 220 as a pattern of simple rectangles, and does not show all the various components that would be in such a device. In one embodiment sensor electrodes 210 are configured as receiver electrodes and sensor electrodes 220 are configured as transmitter electrodes.

Sensor electrodes 210 and 220 are typically ohmically isolated from each other. That is, one or more insulators separate sensor electrodes 210 and 220 and prevent them from electrically shorting to each other. In some embodiments, sensor electrodes 210 and 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and 220 are separated by one or more layers of insulative material. In some other embodiments, sensor electrodes 210 and 220 are separated by one or more substrates; for example, they may be disposed on opposite sides of the same substrate, or on different substrates that are laminated together.

In various embodiments, the areas of localized capacitive coupling between transmitter electrodes and receiver electrodes may be termed "capacitive pixels." The capacitive coupling between the transmitter electrodes and receiver electrodes change with the proximity and motion of input objects in the sensing region associated with the transmitter electrodes and receiver electrodes.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings at the capacitive pixels.

A set of sensor values from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Figure 3:
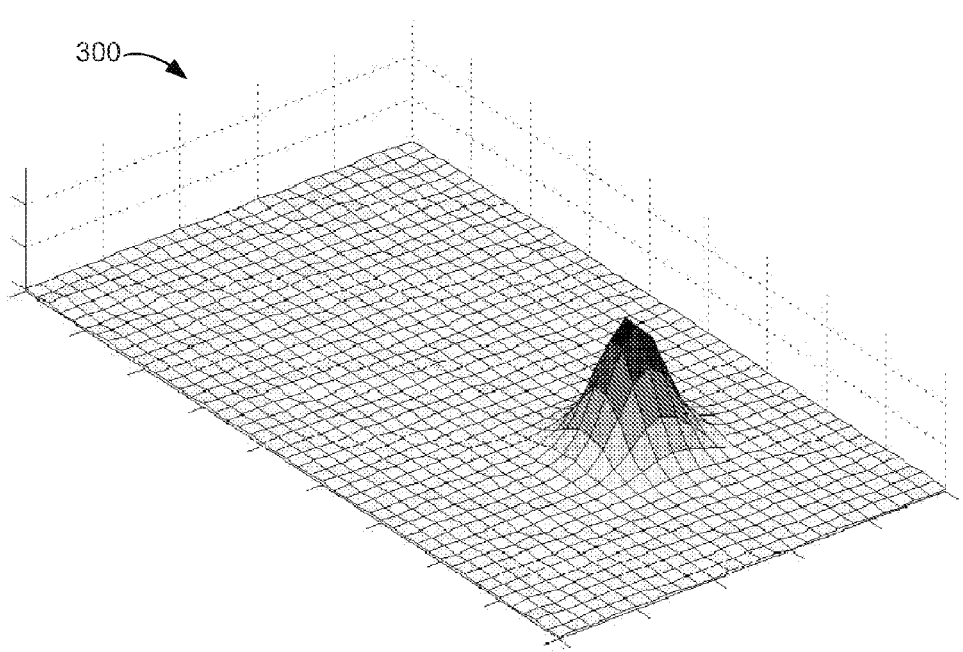
FIG. 3 is a view of a capacitive image of an input object in a sensing region in accordance with an embodiment of the invention.

Turning now to FIG. 3, this figure illustrates an example capacitive image 300 with an input object in a sensing region. In this illustrated embodiment, the presence of an input object is represented as an increase in the sensor values (in the direction of z-axis) in the area of the input object. However, it should be noted that this is just one example, and in some cases the change in capacitance caused by the presence of the object would be manifest as a decrease in the measured values.

It should be noted that the capacitive images, such as the example illustrated in FIG. 3, may be generated from signals in a variety of ways and in a variety of formats. In one embodiment, the input device may receive resulting signals from the receiver electrodes and generate preliminary values that correspond to the measured capacitance associated with each capacitive pixel. In another embodiment, the input device may receive resulting signals from the sensor electrodes and generate preliminary values that correspond to the measured capacitance associated with each electrode. In various embodiments, the measured capacitance may comprise effects corresponding to input objects in the sensing region, background capacitance, external interference, internal interference and other sources. Furthermore, the resulting signals may be sampled, amplified, filtered, or otherwise conditioned as desirable to generate the preliminary values. For example, in one embodiment an input object in the sensing region may decrease the measured capacitive coupling; however, the corresponding preliminary value may be represented as being positive, a negative of the measured capacitance. As such, while the measured capacitance may decrease the corresponding preliminary value is positive. In other embodiments, preliminary values corresponding to a decrease in the measured capacitive coupling may be represented as being negative.

In a typical embodiment the preliminary values are then compared to corresponding baseline values. For example, the difference between each preliminary value and its corresponding baseline value may be determined, and that difference then used as a measured value or sensor value for determining input in the sensing region. In one embodiment, the baseline values conceptually serve as a reference point for measuring changes that occur over time. Further, the sensor values may be considered to be delta values, i.e., the change in the preliminary values compared to baseline values. In one embodiment, at least one of the sensor values and the duration of the input object in the sensing region are used to determine that an input object is in the sensing region. It should be noted that in a typical embodiment, there is a one to one correspondence between the preliminary values and their corresponding baseline values. Thus, every preliminary value is compared to its own corresponding baseline value to determine a sensor value. In other embodiments, a baseline value may correspond to more than one preliminary value. The number of preliminary values generated and baseline values compared to may depend on the number of electrodes used and the sensing technology. In some embodiments the baseline values are comprised in a "baseline image" or "baseline images".

As was described above, during operation of the input device 100, the processing system 110 is configured to identify a portion of an image of sensor values as corresponding to at least one sensed object in the sensing region, determine a polygon corresponding to the identified portion of the image, and determine a contact characterization of the at least one sensed object based on the polygon. In one embodiment, identifying portions of the image of sensor values that correspond to at least one sensed object may be performed by determining which pixels have sensor values that are beyond a specified threshold. In such implementations "beyond a threshold" may be those sensor values that are above a minimum threshold value, while in other cases "beyond a threshold" may be those sensor values that are below a maximum threshold value. In either case, those sensor values in the portion of the image that corresponding to at least one sensed object may be identified by determining which sensor values are beyond the appropriate threshold.

Figures 4A, 4B:
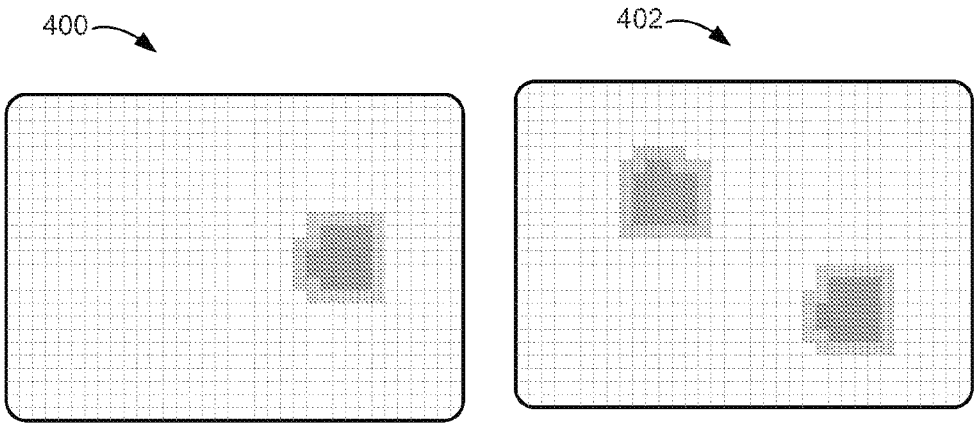
FIGS. 4A and 4B are images of sensor values in a sensing region in accordance with an embodiment of the invention

Turning now to FIG. 4A, a sensor response image 400 of sensor values in a sensing region is illustrated. In this figure, sensor values for each pixel are illustrated as a square. Those sensor response for values that are beyond the threshold, and thus correspond to a sensed object are illustrated as dark grey squares. Sensor response for values for pixels that are adjacent to such sensor values are illustrated as light grey squares, while other sensor values (for those pixels that are not beyond the threshold or adjacent to those that are beyond the threshold) are illustrated as white squares. As can be seen in FIG. 4A, those pixels beyond the threshold at least roughly correspond to the shape of the input object in the sensing region that is causing the change in capacitance. It should of course be noted that while the sensor response is illustrated with squares, the values themselves are not actually square, and instead only represent the sensor response at a corresponding point in the electrode structure.

In addition to comparing sensor values to a threshold, the process of identifying sensor values that correspond to an input object may also comprise the grouping of such sensor values together into one or more groups using a variety of techniques. Such techniques may identify contiguous or otherwise connected regions of the image. For example, it is generally desirable to group sensor values that likely correspond to each object into a separate group or "blob". This may be accomplished by grouping all sensor values that are beyond a threshold and are adjacent to at least one other such sensor value in one group, with other sensor values that are beyond the threshold put into other groups. Identifying the groups of sensor values that are beyond a threshold and adjacent to at least one other threshold is sometimes referred to "segmenting" the image. In the example of FIG. 4A all of sensor values beyond the threshold (identified in dark grey) are part of the same portion of the image or "blob". Note that in FIG. 4A each of the dark grey pixels are adjacent to at least one other such pixel, and as such would be grouped together into the same portion or blob.

Turning to FIG. 4B, a second image of sensor values 402 in a sensing region is illustrated. In this example, there are two disjoint groups or sensor values that are beyond the threshold, and thus segmenting the image as described above would result in two separate and distinct groups of sensor values that are beyond the threshold.

It should also be noted that in some cases it may not be easily determined if a group of sensor values that are beyond a threshold correspond to one or more objects. For example, where two objects are close together such that the objects strongly effect the same and/or adjacent pixels. However, as will be described below, the generation of polygons to represent the sensor values may be used to facilitate a more reliable determination of the number of objects even when segmenting as described above would not properly or reliably identify separate objects.

With the portions of the sensor values corresponding to objects determined as described above, the processing system is further configured to determine a polygon corresponding to the identified portions of the image. In general, the polygon is determined such that it may substantially coincide with the identified portion of the image corresponding to the sensed object. As will be described in detail below, such determined polygons provide approximated boundary representations of the sensed object, and thus may be used to determine characteristics of such sensed objects. Furthermore, such a determined polygon may be used to facilitate the accurate tracking of motion of these sensed objects, and thus may be used to facilitate user interface actions in response to such motion. It is generally desirable for the determination of the polygon to be performed in a manner that provides for high level of accuracy and consistency from image to image, as the consistency results in smooth object tracking and improved usability for the user.

Figure 5:
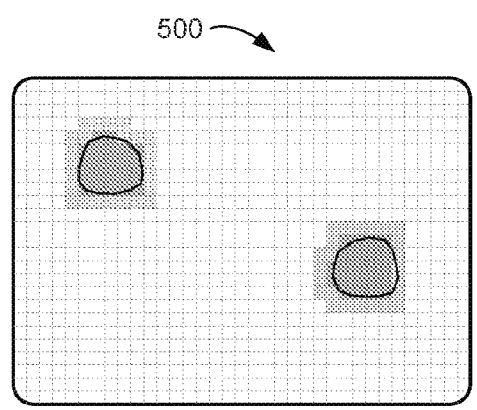
FIG. 5 is an image of sensor values in a sensing region in accordance with an embodiment of the invention.

Turning now to FIG. 5, an image of sensor values 500 illustrate examples of determined polygons that correspond to the identified portions of the image. As can be seen in FIG. 5, the determined polygons provide approximated boundary representations of the sensed objects. In other words, the determined polygon provides an approximation of the "contact area" that corresponds to the sensed object. As can be appreciated, a determined polygon provides information about the size, shape, boundary and orientation of the sensed object without requiring information regarding the sensor values corresponding to the interior of the polygon. However, in some embodiments, information regarding the sensor values in the interior of a polygon is further used to determine characteristics of sensed objects. A variety of different techniques may be used to determine polygons corresponding to the identified portions of the object. For example, such techniques may determine polygons by determining the vertices of the polygon using the sensor values.

For example, given the identified sensor values corresponding to the object, each vertex of the polygon may be determined by comparing a sensor value from the identified portion of the image (e.g., from sensor values within the blob) with at least one adjacent sensor value not from the identified portion of the image (i.e., sensor values outside the blob). These comparisons can take a variety of forms. Additionally, these adjacent sensor values used in the comparison can include directly adjacent sensor values and/or diagonally adjacent sensor values. In these cases each such comparison between the sensor value and an adjacent sensor value will determine a vertex of the polygon. Thus, the more sensor values compared, the more vertices determined, and the higher the count (i.e., the greater number of sides) in the polygon.

The comparison used to determine the vertices may be performed using a variety of mathematical techniques. For example, by interpolating between the sensor value inside the identified portion and the adjacent sensor value outside the identified portion. In some embodiments such an interpolation can be a straightforward linear interpolation between two values. In other embodiments however, the interpolation can be a weighted or otherwise more mathematically complex interpolation that compares multiple values to determine the vertices.

In general, such techniques may be used to identify vertices that correspond to estimated locations that have a specific sensor value. For example, where there are neighboring pixels, one of which is below a threshold value and one of which is above the threshold value, some embodiments may interpolate (e.g. perform a linear, one-dimensional interpolation or other interpolation) to estimate a location in the image that is at the specific sensor value magnitude. Since there are a finite number of locations at the specific sensor value, each of such locations may define the vertex of a polygon that may be connected with a set line segments. These interpolated locations, at the specific sensor values, form the vertices of a polygon fitted to the identified portion of the image. In some embodiments, the specific value magnitude can be chosen to be within a region where change-in-capacitance-to-signal-value is relatively high and/or the specific value magnitude can be chosen to be a range of values, wherein such a range would provide accurate and consistent results. This may be useful to minimize the impact of noise or interference, for example.

With the polygon corresponding to the identified portions of the image determined, the polygon may be used by the processing system to characterize the sensed object. Such a characterization may be used in determining a variety of user interface actions. For example, such a characterization may be used to determine if the sensed object is in fact one or more sensed objects. Additionally, such a characterization may be used to determine and track motion of the sensed object. Additionally, such a characterization may be used to determine an orientation of the sensed object. These examples and others will be described in greater detail below with references to FIGS. 9 and 10.

Turning now to FIGS. 6-7, detailed examples of techniques for determining a polygon corresponding to the identified portions of the image the image will be given. As described above, the polygons are determined to provide approximated boundary representations of the sensed object, and thus may be used to determine characteristics of such sensed objects and provide for the accurate tracking of motion of these sensed objects.

Figure 6A:
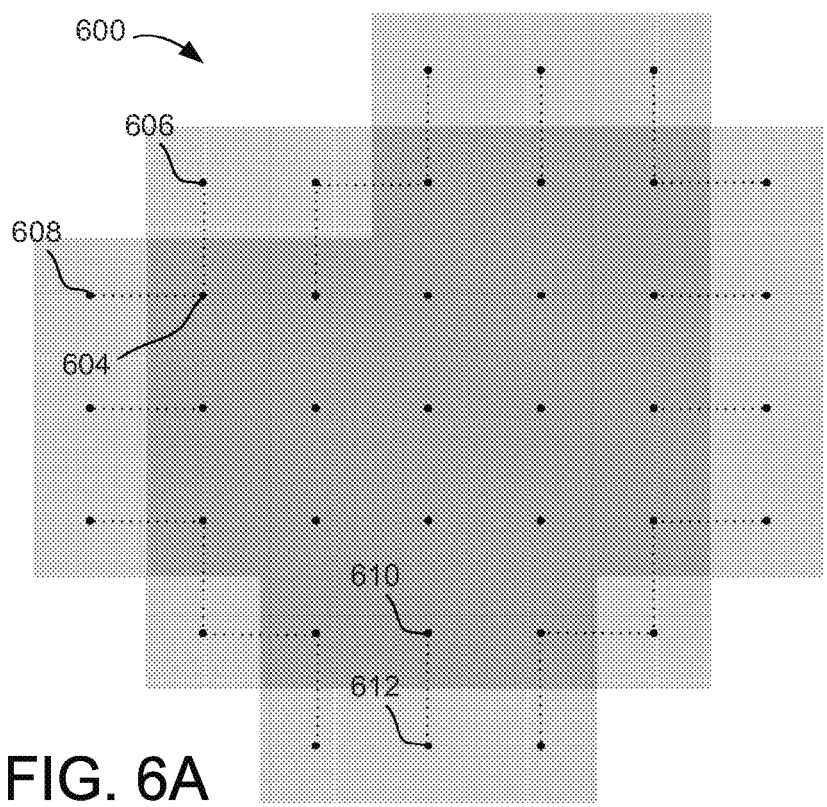
FIGS. 6A and 6B is a portion of an image of sensor values showing determined vertices and a polygon in accordance with an embodiment of the invention.

Turning now to FIG. 6A, a portion of an image of sensor values 600 is illustrated. In portion 600 the sensor value for each pixel is represented as a square with a center dot. The square represents the area of the corresponding pixel, with the dot identifying the center of the pixel. In FIG. 6A, sensor values have been analyzed to determine those that correspond to the object. As described above, this may be accomplished by comparing sensor values to one or more thresholds. In this FIG. sensor values that are beyond the threshold are illustrated in dark grey, and other sensor values, including those that are adjacent to such sensor values are illustrated in light grey.

Figure 6B:
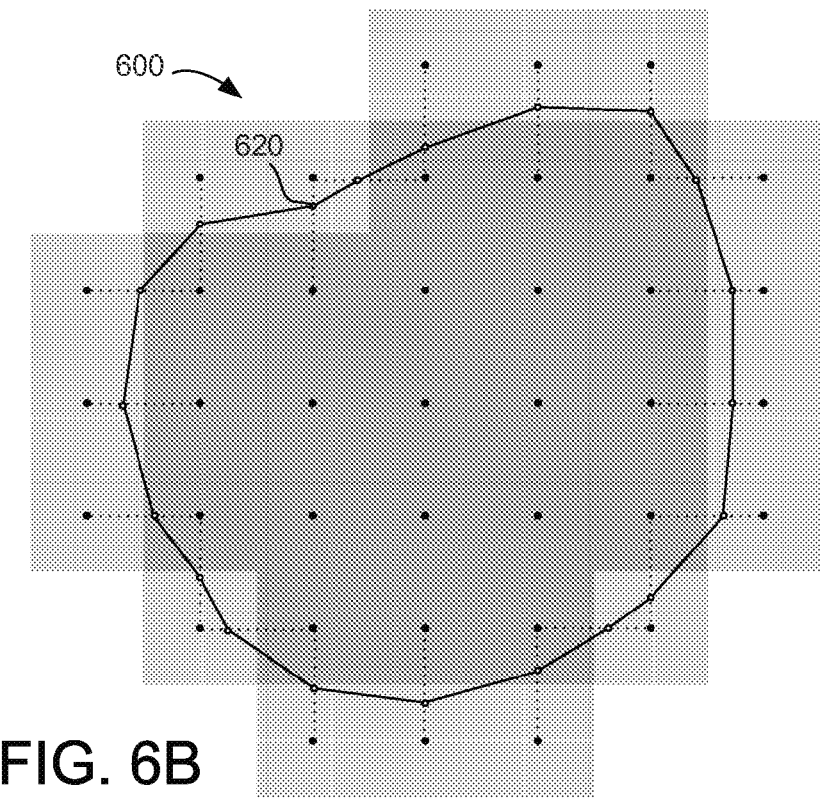

In the example of FIG. 6A-6B the vertices of the polygon are determined by interpolating sensor values in the identified region with those that are outside the region and "directly adjacent" to that pixel. In general, "directly adjacent" sensor values are those adjacent sensor values that are most closely arranged from the sensor value of interest. Each such interpolation results in a value that may be used as a vertex of the polygon. In FIG. 6A, the sensor values that are directly adjacent to sensor values in the identified region are illustrated by dashed lines between center dots. It should be noted that such interpolation occurs between sensor values that are at the edge of the identified region. As one example, the sensor value 604 is interpolated with directly adjacent sensor values 606 and 608. As can be seen, the number of interpolations that are performed for a given sensor value in the identified region depends upon whether the adjacent values are also within the region or not within the region. Thus, a sensor value such as value 610 will only be interpolated with one other sensor value (i.e., 612) as there is only one such directly adjacent value that is outside the identified region.

Thus, each sensor value inside the identified region and at the edge of the identified region is interpolated with any directly adjacent sensor values. As described above, this interpolation may be performed with a variety of mathematical calculations, including linear and non-linear interpolations.

Exemplary results of such an interpolation are shown in FIG. 6B. As can be seen in FIG. 6B, each interpolation generated a vertex (e.g., vertex 620) which defines in part the polygon. The resulting polygon provides an approximated boundary representation of the object. As such, the determined polygon provides an approximation of the "contact area" that corresponds to the sensed object. As such, the polygon may be used to characterize and/or track the motion of the sensed object.

Figure 7A:
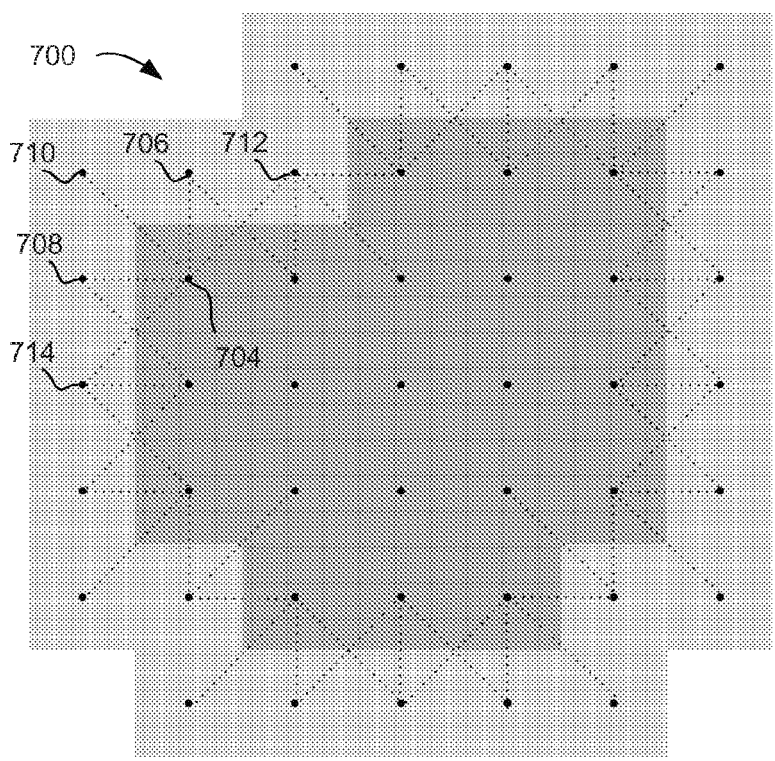
FIGS. 7A and 7B is a portion of an image of sensor values showing determined vertices and a polygon in accordance with an embodiment of the invention.
Figure 7B:
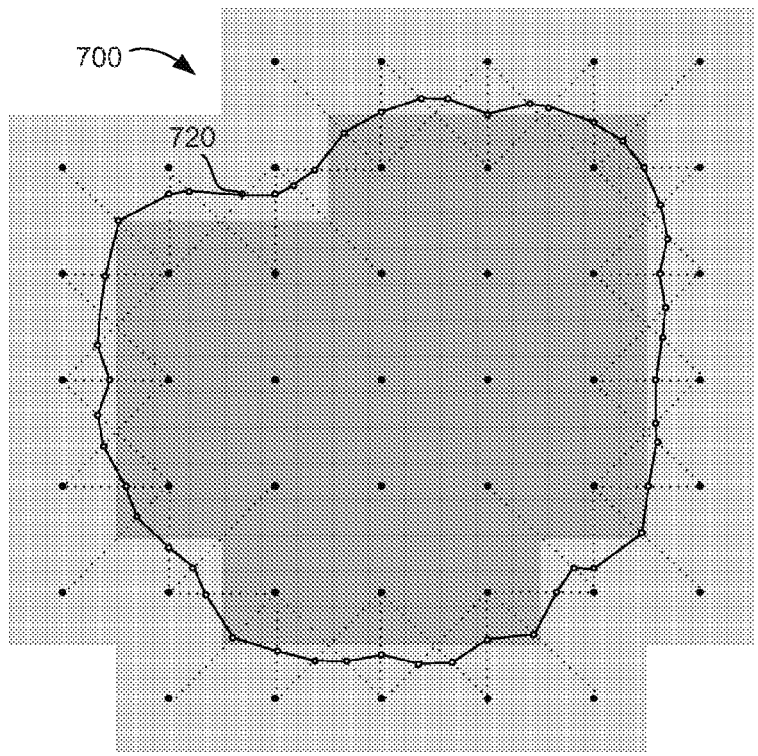

Turning now to FIG. 7A-7B, a second exemplary portion of an image of sensor values 700 is illustrated. Again, in portion 700 sensor values have been analyzed to determine those that correspond to the object, and sensor values that are beyond the threshold are illustrated in dark grey, and other sensor values, including those that are adjacent to such sensor values are illustrated in light grey.

In the example of FIG. 7A-7B the vertices of the polygon are determined by interpolating sensor values in the identified region with those that are outside the region and adjacent to that pixel. Each such interpolation results in a value that may be used as a vertex of the polygon. In FIG. 7A, the sensor values that are either "directly" or "diagonally" adjacent to sensor values in the identified region will be used for the interpolation. As was noted above, "directly adjacent" sensor values are those other sensor values that are most closely arranged. Likewise, "diagonally adjacent" sensor values are those sensor values that are less closely arranged in diagonal directions from the sensor value at interest. Naturally, which sensor values would be considered to be "directly" or "diagonally" adjacent would depend on the particular arrangement of the electrodes and resulting pixels in the sensor device. In FIG. 7 the interpolation between both directly adjacent and diagonally adjacent sensor values are illustrated by the dashed lines between center dots. As is seen in FIG. 7A, by also performing interpolations between sensor values that are diagonally adjacent a larger number of vertices are generated.

As one example, the sensor value 704 is interpolated with a five other sensor values, including those that are directly adjacent (sensor values 706 and 708) and those that are diagonally adjacent (sensor values 710, 712, and 714). As is clear, additionally performing interpolation with diagonally adjacent sensor values can greatly increase the number of vertices that are generated. This may improve the accuracy of the polygon but also increases computational intensity.

Thus, each sensor value inside the identified region and at the edge of the identified region is interpolated with any directly or diagonally adjacent sensor values. As described above, this interpolation may be performed with a variety of mathematical calculations, including linear and non-linear interpolations.

Exemplary results of such an interpolations are shown in FIG. 7B. As can be seen in FIG. 7B, each interpolation generated a vertex (e.g., vertex 720) which defines in part the polygon. The resulting polygon provides an approximated boundary representation of the object. As such, the polygon may be used to characterize and/or track the motion of the sensed object.

In some embodiments, typically where vertices are created from interpolations with directly adjacent sensor values, the polygon is simply created by connecting neighboring vertices in a logical manner around the edge of the identified "blob". In some embodiments, such as where vertices are created from interpolation with directly and diagonally adjacent sensor values there may be ambiguity as to the correct ordering of the vertices. The ambiguity in vertices ordering may result in the generation of ill-defined and unstable polygons with "tangled" sides that intersect with and cross other sides. In such a situation the perimeter, area and other characteristics of the polygon may change dramatically based on arbitrary changes in vertex ordering and not from actual changes in sensor signal information. To avoid this, a variety of techniques may be used to determine the ordering of vertices in the polygon. Such techniques may include averaging diagonally adjacent vertices between directly adjacent vertices (averaging any possible intersecting vertices), or similar mathematical techniques.

It should be noted that the process used to generate the vertices and define the polygon does not require the use of "interior" sensor values. In particular, those values that are not at the edge of the identified region of sensor values are not required to calculate the vertices of the polygon. Instead, the examples illustrated above use only those sensor values at the edge of the identified region and those outside the region. Because these other values can be ignored the processing required to generate the polygon may be greatly simplified and thus can improve device performance. At the same time, it should be appreciated that further interior and/or exterior sensor values may be used to improve or otherwise enhance the previously generated polygon.

Furthermore, once the polygon is generated all sensor values may be discarded and only the vertices may be used to characterize and/or track motion of the object. Again, this can greatly simplify processing and improve device performance.

Finally, such performance can be even further improved by using a reduced parameter representation of the polygon. Specifically, while such a generated polygon may be used to characterize and/or track the motion of the sensed object in some cases it may be desirable to generate a reduced parameter representation of the polygon. The reduced parameter representation of the polygon may facilitate tracking of object motion with even less intensive resource requirements. To accomplish this, the reduced parameter representation is fitted to the polygon such that the reduced parameter representation may serve as an approximation or proxy for the polygon. Examples of shapes that may be used for the reduced parameter representations include circles and other ellipses. Additionally, other shapes, including reduced order polygons may be used.

Figure 8:
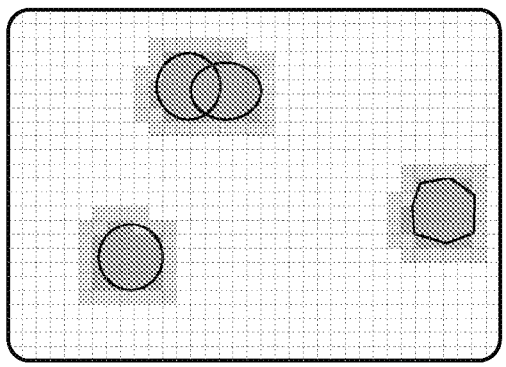
FIG. 8 is an image of sensor values showing several examples of reduced parameter representations in accordance with an embodiment of the invention.

Turning now to FIG. 8, several examples of reduced parameter representations are illustrated. These examples include a circle, an ellipse, and a lower order polygon. Each of these shapes can be used to represent the polygon or other boundary representation. As such, the reduced parameter representations may be used to characterize and/or track the motion of the sensed object while requiring less computing resources than the full order polygon.

As described above, the polygon or reduced parameter representation may be used in determining a variety of user interface actions. For example, properties of the polygon or reduced parameter representation may be used to characterize the sensed object, and that characterization used to generate a user interface action. As examples, the processing system may be configured to determine a centroid of the polygon, an orientation of the polygon, the convexity of the polygon or the aspect ratio of the polygon. Each of these properties of the polygon can be used to determine a characteristic of the sensed object.

Figure 9A:
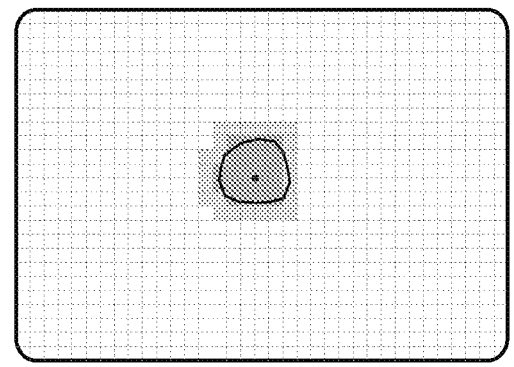
FIGS. 9A-9D are images of sensor values showing example determined polygons and determined characteristics of polygons in accordance with embodiments of the invention.

Turning now to FIG. 9A, a portion of an image of sensor values is illustrated showing a determined polygon and a corresponding centroid of the polygon. The centroid of the determined polygon may be calculated using any suitable technique and used to track the movement of the polygon. For example, by computing the centroid of the polygon each measurement cycle and determining the change of position of the centroid, the motion of the sensed object may be accurately tracked.

For example, let $\{(x_i, y_i)\}_{i=0, \ldots, N}$ define, in X-Y coordinates, the polygon created for an identified region of the image corresponding to a sensed object, where $(x_0, y_0) = (x_N, y_N)$ (so as to close the polygon). In this embodiment the centroid $(\bar{x}, \bar{y})$ of the polygon may be defined as:

$$\bar{x} = \alpha_{1,0}$$

$$\bar{y} = \alpha_{0,1}$$

Where $\alpha_{1,0}$ and $\alpha_{0,1}$ are defined as $$\alpha_{1,0} = \frac{1}{6A} \sum_{i=1}^{n} (x_{i-1}y_i - x_i y_{i-1})(x_{i-1} + x_i)$$

$$\alpha_{1,0} = \frac{1}{6A} \sum_{i=1}^{n} (x_{i-1}y_i - x_i y_{i-1})(y_{i-1} + y_i)$$

where $$A = \frac{1}{2} \sum_{i=1}^{n} x_{i-1} y_i - x_i y_{i-1}$$

When so calculated, such a centroid can be used to estimate a location of or other positional information about the sensed object. Using such a centroid of the polygon to track provides a single point to define the location of a senses object.

Figure 9B:
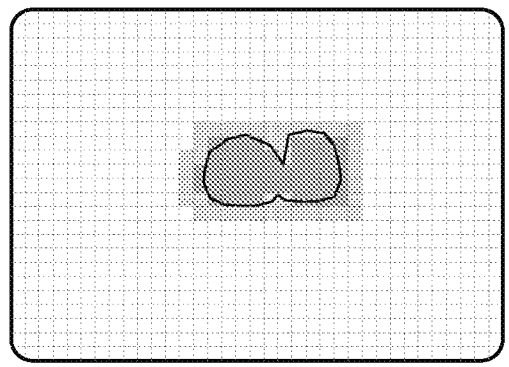

Turning now to FIG. 9B, a portion of an image of sensor values is illustrated showing a determined polygon that is convex. In general, a polygon may be determined to be convex or concave by calculating the interior angles of the polygon. If one of the interior angles is greater than 180 degrees then the polygon is convex. Of course, this is just one example of how convexity could be calculated. Convex polygons are indicative of a sensed object that actually comprises multiple objects, as the large interior angle typically occurs where the two objects come together and occlude each other. Thus, by calculating the convexity of the polygon the number of objects in the identified region may be determined to be greater than one.

As one example, the convexity of the polygon may be determined by evaluating the sign of $(\Delta x_i, \Delta y_i) \times (\Delta x_{i+1}, \Delta y_{i+1})$, where $\Delta x_i = x_i - x_{i-1}$ and $\Delta y_i = y_i - y_{i-1}$, and the operator 'x' denotes the vector cross product. In this embodiment the polygon may be considered to be convex if $(\Delta x_i, \Delta y_i) \times (\Delta x_{i+1}, \Delta y_{i+1})$ does not change signs for all i. Other embodiments determine convexity by using a convexity metric. An example convexity metric for a polygon is the ratio between the area of the polygon and the area of the convex hull of the polygon. In such an embodiment the convexity metric is one if the polygon is convex.

In some embodiments other factors are used to distinguish between one or more sensed objects. For example, in addition to determining if the polygon is non-convex, it may be determined if the area of sensed object is relatively large or small, if the length or width is relatively large or small etc. In all these cases the convexity of the polygon is used to determine if the sensed object actually corresponds to multiple adjacent objects and not merely one sensed object.

Figure 9C:
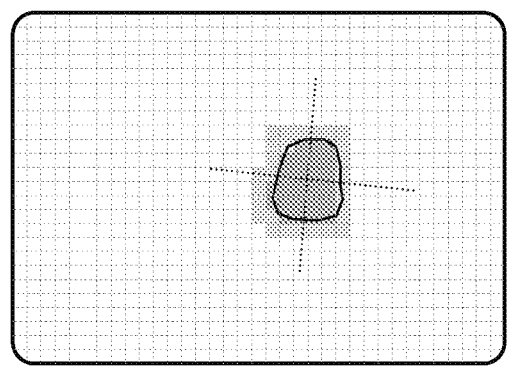

Turning now to FIG. 9C, a portion of an image of sensor values is illustrated showing a determined polygon and a corresponding orientation of polygon. The orientation of the determined polygon may be calculated using a variety of techniques. Once calculated, the orientation of the polygon may be used to determine the orientation of the finger or other input objects. The orientation of the finger may then be used in any suitable manner to generate user interface actions.

As one example, various moments may be calculated and used in determining the orientation of the polygon. For example, some embodiments may determine the zero'th order moment (un-normalized) of a polygon by estimating the area (A) of the polygon as follows:

$$A = \int\int_{\Omega} dx dy.$$

In such an embodiment the normalized moments ($\alpha$) may be defined by:

$$\alpha_{p,q} \equiv \frac{1}{A} \int\int_{\Omega} x^p y^q dx dy.$$

Where the sum of p and q is the order of the moment. Similarly, the normalized central moments ($\mu$) may be defined by:

$$\mu_{p,q} \equiv \frac{1}{A} \int\int_{\Omega} (x - \alpha_{1,0})^p (y - \alpha_{0,1})^q dx dy.$$

Some embodiments may make use of moment calculations specialized to polygons. For example, the lower order moments for a polygon can be written in terms of the vertex locations, such as follows:

$$\alpha_{2,0} = \frac{1}{12A} \sum_{i=1}^{n} (x_{i-1}y_i - x_i y_{i-1})(x_{i-1}^2 + x_{i-1}x_i + x_i^2)$$

$$\alpha_{1,1} = \frac{1}{24A} \sum_{i=1}^{n} (x_{i-1}y_i - x_i y_{i-1})(2x_{i-1}y_{i-1} + x_{i-1}y_i + x_i y_{i-1} + 2x_i y_i)$$

$$\alpha_{0,2} = \frac{1}{12A} \sum_{i=1}^{n} (x_{i-1}y_i - x_i y_{i-1})(y_{i-1}^2 + y_{i-1}y_i + y_i^2)$$

$$\mu_{2,0} = \alpha_{2,0} - \alpha_{1,0}^2$$

$$\mu_{1,1} = \alpha_{1,1} - \alpha_{1,0}\alpha_{0,1}$$

$$\mu_{0,2} = \alpha_{0,2} - \alpha_{0,1}^2$$

Figure 9D:
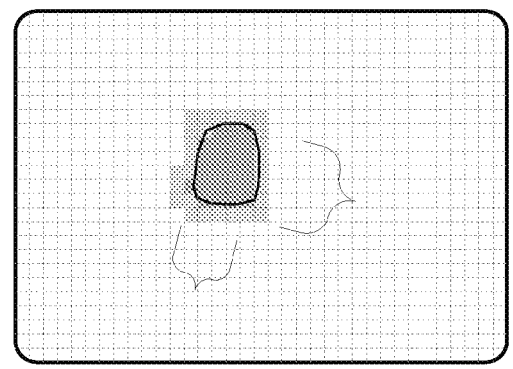

Various embodiments use these moments to determine characteristics of the sensed object from the polygon, such its centroid, area, orientation, eccentricity and width, and convexity of the polygon. Turning now to FIG. 9D, a portion of an image of sensor values is illustrated showing a determined polygon that as an aspect ratio. In general, the aspect ratio is the ratio of the length to the width of the polygon.

Figure 10A:
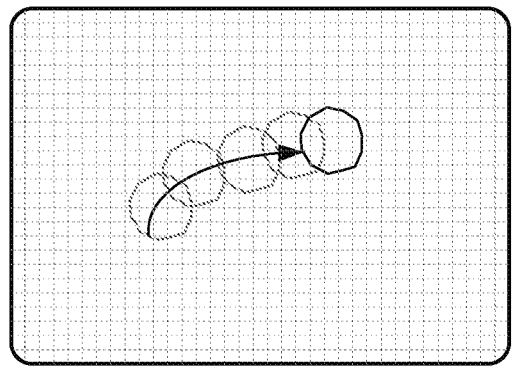
FIGS. 10A-10B illustrate portions of example images of sensor values in accordance with embodiments of the invention.

As described above, the polygon or reduced parameter representation may be used in determining a variety of user interface actions. For example, the polygon or reduced parameter representation may be used to determine and track motion of the sensed object. Turning now to FIG. 10A, a portion of an image of sensor values is illustrated showing how a polygon may be tracked across the sensing region. Specifically, by tracking the change in position of the polygon the change in position of the input object may be accurately determined and used to generate a corresponding user interface action. This can be done by tracking various characteristics of the polygon, including the one or more vertices of the polygon, an edge of the polygon, the centroid of the polygon, etc.

On particular benefit in using a polygon to track sensed objects is that the polygon provides the ability to reliably track objects even when those objects become occluded. For example, when those objects move out of the sensing region, or become blocked by some other element. Specifically, by calculating the polygons each cycle and tracking the centroid, edge or other characteristic of the polygon the motion of the input objects may be determined even when the object becomes significantly occluded.

Figure 10B:
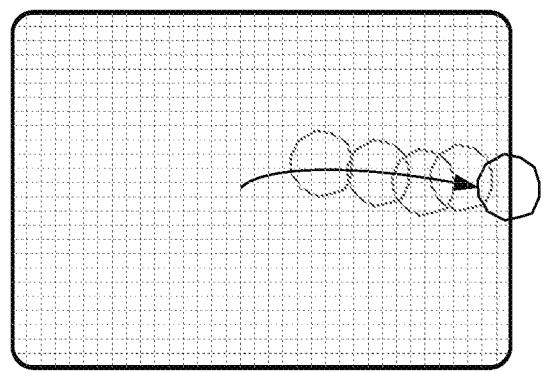

Turning now to FIG. 10B, a portion of an image of sensor values is illustrated showing an input object as it moves out of the sensing region. As can be seen, by tracking the centroid, edge or other characteristic of the polygon the motion of the input object may be accurately tracked even after the object has moved partially out of the sensing region. Thus, the determination of polygons facilitates accurate tracking of objects in the sensing region beyond those available using traditional techniques. Furthermore, because the polygons may be determined even as the object moves out of the sensing region and becomes occluded, the effective area of the sensing region is increased.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for use with a capacitive input device that senses objects in a sensing region, comprising:
    a sensor circuitry configured to operate a plurality of sensor electrodes to acquire resulting signals; and
    a determination circuitry configured to:
        determine an image of sensor values based on the resulting signals;
        identify a portion of the image corresponding to a sensed object in the sensing region;
        determine a polygon corresponding to the sensed object by:
            identifying a first pixel within the identified portion of the image;
            identifying a plurality of pixels that are adjacent to the first pixel but external to the identified portion of the image; and
            determine a vertex of the polygon by interpolating based on a sensor value for the first pixel in the image and a plurality of sensor values for the plurality of pixels in the image;
        track the sensed object based on the polygon; and
        perform a graphical user interface action based on a characteristic of the polygon.

2. The processing system of claim 1, wherein the determination circuitry tracks the sensed object based on the polygon by determining at least one parameter selected from a group consisting of a centroid of the polygon, an area of the polygon, an orientation of the polygon, an eccentricity of the polygon, a width of the polygon, and an edge of the polygon.

3. The processing system of claim 1, wherein the graphical user interface action comprises at least one action selected from a group consisting of cursor movement and menu navigation.

4. The processing system of claim1, wherein the determination circuitry is further configured to track the sensed object after the sensed object has moved partially out of the sensing region.

5. The processing system of claim 4, wherein the determination circuitry tracks the sensed object after the sensed object has moved partially out of the sensing region by calculating a centroid of the polygon or an edge of the polygon before the sensed object has moved partially outside of the sensing region.

6. The processing system of claim 1, further comprising a display circuitry that operates a display of the capacitive input device.

7. The processing system of claim 6, wherein the sensor circuitry and the display circuitry share an electrical component, and the electrical component is utilized for display and sensing with the input device.

8. The processing system of claim 1, wherein:
    the plurality of pixels comprises:
        a second pixel that shares an edge with the first pixel; and
        a third pixel that is diagonal to the first pixel; and
    the vertex is not on the edge shared by the first pixel and the second pixel.

9. The processing system of claim 8, wherein the determination circuitry is further configured to:
    determine a normalized moment of the polygon based on the vertex; and
    determine the characteristic of the polygon based on the normalized moment.

10. The processing system of claim 9, wherein the vertex is outside the identified portion of the image.

11. The processing system of claim 8, wherein the determination circuitry is further configured to:
    determine a convexity of the polygon based on the vertex; and
    determine the identified portion of the image corresponds to only one sensed object based on the convexity.

12. The processing system of claim 11, wherein determining the convexity of the polygon comprises:
    determining a plurality of vectors based on adjacent vertices of the polygon;
    calculating a plurality of cross-products based on the plurality of vectors; and
    determining there is no change in sign among the plurality of cross-products.

13. The processing system of claim 11, wherein determining the convexity of the polygon comprises:
    determining a first area of the polygon;
    determining a second area of the convex hull of the polygon; and
    determining a ratio of between the first area and the second area.

14. An input device comprising:
    a plurality of capacitive sensor electrodes configured to sense in a sensing region;
    a sensor circuitry configured to operate the plurality of sensor electrodes;
    a display; and
    a processing system coupled to the plurality of capacitive sensor electrodes, the processing system configured to:
        determine an image of sensor values based on resulting signals acquired by the plurality of capacitive sensor electrodes;
        identify a portion of the image corresponding to a sensed object in the sensing region;
        determine a polygon corresponding to the sensed object by:
            identifying a first pixel within the identified portion of the image;
            identifying a plurality of pixels that are adjacent to the first pixel but external to the identified portion of the image; and determine a vertex of the polygon by interpolating based on a sensor value for the first pixel in the image and a plurality of sensor values for the plurality of pixels in the image;

track the sensed object based on the polygon; and perform a graphical user interface action based on a characteristic of the polygon.

15. The input device of claim 14, wherein the processing system tracks the sensed object based on the polygon by determining an edge of the polygon.

16. The input device of claim 14, wherein the processing system is further configured to track the sensed object after the sensed object has moved partially out of the sensing region.

17. The input device of claim 16, wherein the processing system is further configured to track the sensed object after the sensed object has moved partially out of the sensing region by calculating a centroid or edge of the polygon before the sensed object has moved partially outside of the sensing region.

18. A non-transitory computer readable medium (CRM) storing instructions for performing graphical user interface actions in response to sensing objects in a sensing region, the instructions comprising functionality to:

determine an image of sensor values based on resulting signals acquired by a plurality of capacitive sensor electrodes;

identify a portion of the image corresponding to a sensed object in the sensing region;

determine a polygon corresponding to the sensed object by:

identifying a first pixel within the identified portion of the image;

identifying a plurality of pixels that are adjacent to the first pixel but external to the identified portion of the image; and determine a vertex of the polygon by interpolating based on a sensor value for the first pixel in the image and a plurality of senor values for the plurality of pixels in the image;

track the sensed object based on the polygon; and perform a graphical user interface action based on a characteristic of the polygon.

19. The non-transitory CRM of claim 18, wherein the instructions further comprise functionality to track the sensed object based on the polygon by determining at least one parameter selected from a group consisting of an edge of the polygon and a centroid of the polygon.

20. The non-transitory CRM of claim 18, wherein the instructions further comprise functionality to:

track the sensed object after the sensed object has moved partially out of the sensing region by calculating a centroid or edge of the polygon before the sensed object has moved partially outside of the sensing region.

* * * * *

UNITED STATES PATENT AND TRADEMARK OFFICE
CERTIFICATE OF CORRECTION

PATENT NO. : 10,168,843 B2
APPLICATION NO. : 15/152814
DATED : January 1, 2019
INVENTOR(S) : Patrick Worfolk et al.

Page 1 of 1

It is certified that error appears in the above-identified patent and that said Letters Patent is hereby corrected as shown below:

In the Claims

Claim 18, Column 20, Line 10, the word "senor" should read -- sensor --.

Signed and Sealed this
Twenty-first Day of April, 2020

Andrei Iancu
*Director of the United States Patent and Trademark Office*